United States Patent [19]

Jones

[11] Patent Number: 4,832,414
[45] Date of Patent: May 23, 1989

[54] FILAMENT WOUND WHEEL AND A METHOD FOR MANUFACTURING THE SAME

[75] Inventor: Brian H. Jones, San Gabriel, Calif.

[73] Assignee: Kelsey-Hayes Company, Romulus, Mich.

[21] Appl. No.: 23,350

[22] Filed: Mar. 9, 1987

[51] Int. Cl.⁴ .................... B60B 21/00; B60B 5/02
[52] U.S. Cl. ........................... 301/63 PN; 301/63 R
[58] Field of Search ............ 301/63 PW, 63 R, 63 C, 301/63 D, 63 DD, 64 DS, 63 DT, 645 H, 65, 66

[56] References Cited

U.S. PATENT DOCUMENTS 3,762,677  10/1973  Adams ............................ 301/63 PW
3,917,352  11/1975  Gageby ............................ 301/64 R
4,527,839  7/1985  Fujitaka et al. ................ 301/63 PW
4,532,097  7/1985  Daniels et al. ................ 301/63 PW Primary Examiner—James B. Marbert
Attorney, Agent, or Firm—Ralph J. Skinkiss; M. Michael Carpenter; Paul J. Rose

[57] ABSTRACT

A filament wound wheel is shown having a high percentage of continuous fiber oriented in the optimum load bearing direction for maximum strength. Also shown is a manufacturing method for the wheel including the steps of polar winding a continuous filament on a split mandrel to form a filament winding, slitting the filament winding on the mandrel to form two preforms, placing the two preforms in a back-to-back configuration, pressing each preform upon its split mandrel under heat to cure and join the preforms and separating the split mandrels from the joined preforms.

10 Claims, 5 Drawing Sheets

FILAMENT WOUND WHEEL AND A METHOD FOR MANUFACTURING THE SAME

The present invention relates to a wheel structure for rotation about an axis and, more particularly, to a wheel structure such as a sprocket carrier and a method for fabricating that sprocket carrier by use of a resin impregnated continuous filament.

BACKGROUND OF THE INVENTION

Wheels have been fabricated from several materials by various methods, including, for example, steel utilizing a stamping process or an alloy using a casting process. Steel wheels are typically thought of as offering high strength characteristics. However, a negative characteristic of the use of steel is its associated weight. To reduce this weight (the undesirable characteristic) considerable attention has been given to cast metal alloy structures which offer the advantage of being much lighter in weight than their stamped steel counterparts, but often more expensive. Filamentary reinforced plastic structures have recently been given attention because of their corrosion resistance and the possibility of lower cost and reduced weight. Further, high strength characteristics may be achieved if a continuous filament is utilized in the wheel structure.

U.S. Letters Pat. No. 3,917,352, by S. D. Gageby, dated Nov. 4, 1975, entitled Continuous-Strand, Fiber Reinforced Plastic Wheel, discloses a wheel having a hub portion and rim portions formed integrally with the hub portion by a continuous filament running from one rim over the hub to the opposite rim. This method of continuously winding the whole wheel tends to accumulate an excessive amount of filament at the center of the hub leading to increased weight.

U.S. Letters Pat. No. 4,527,839, by N. Fujitaka, et al., dated July 9, 1985, entitled Synthetic Wheel Formed From Two Halves, discloses a two piece wheel having a plurality of spokes connected to a central hub. The wheel body is made of a fiber-reinforced resin. However, since the fiber used by Fujitaka is random, the wheel cannot offer the same high strength characteristics as the continuous filament structure of the invention disclosed herein.

SUMMARY OF THE INVENTION

Accordingly, it is an object of the present invention to provide a continuous filament reinforced plastic wheel having lower cost, reduced weight, and high strength.

The low cost, reduced weight, high strength wheel may be utilized for a sprocket carrier, for example. The wheel is formed with a generally Y-shaped cross section wherein the hub of the wheel is formed by the lower single leg of the Y-shape. Connecting webs formed by the two upper arms of the Y-shape join opposite rims which mount the sprockets of the sprocket carrier. The wheel described thus far is formed by a continuous filament which is wound upon a mandrel in a generally spheroidal form and then split into two hemispheroidal preforms which are placed back-to-back and joined at the hub to form the Y-configuration.

The method for forming the reduced weight, high strength wheel according to the present invention provides four principle steps. The first step requires the polar winding of a continuous filament on a split mandrel to form a filament-wound preform having a generally spheroidal shape. The second step calls for splitting the spheroidal filament-wound preform along the center line of the split mandrel to obtain two hemispheroidal preforms. The third step requires the pressing of the two hemispheroidal preforms together back-to-back upon the split mandrel under heat to join and stabilize the preforms. The fourth step separates each split mandrel from the joined preforms leaving the generally Y-shaped wheel.

BRIEF DESCRIPTION OF THE DRAWING

Other objects of the present invention will become apparent by reference to the following detailed description when considered with the accompanying drawings, wherein:

FIG. 3 shows a pair of split, filament-wound preforms;

FIG. 6a illustrates a cylindrically wound preform, while FIG. 6b shows the preform split from its mandrel;

DESCRIPTION OF THE PREFERRED EMBODIMENT

Figure 1:
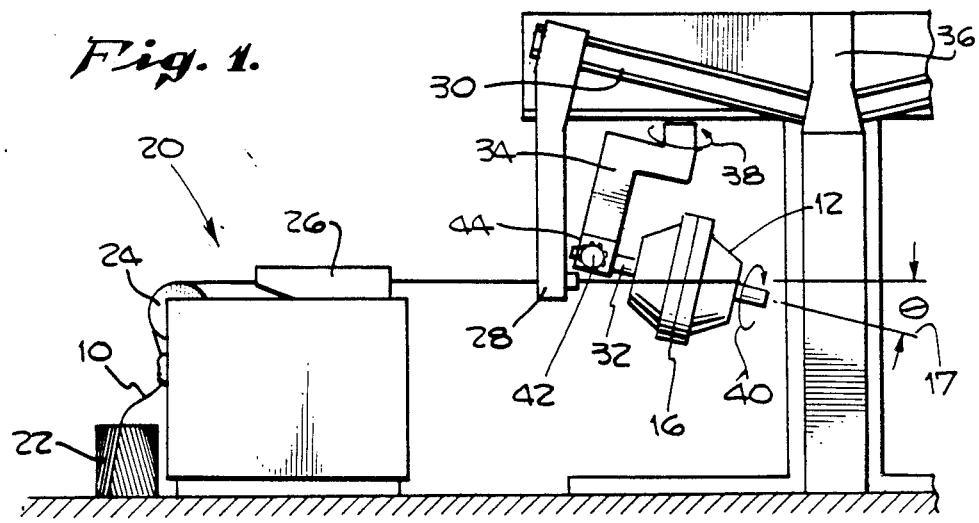
FIG. 1 shows a polar winding apparatus for winding a continuous resin-impregnated filament upon a split mandrel.

Referring now to the drawings, a filamentary reinforced plastic (FRP) wheel structure for rotation about an axis and a method for manufacturing that wheel are shown. The FRP utilized in the construction of the wheel of the present invention may be formed from one of several filaments and resins. The filaments may consist of standard or high strength glass, carbon, or graphite fibers, an aromatic amide structure sold under the trademark Kevlar, boron fibers, nylon fibers, quartz fibers, or any other suitable fibers. The resins may consist of thermo plastics such as polycarbonate, polyetherketone, and polysulfone or thermoplastics such as epoxy, polyester, polyamide, and polyimide. In the preferred embodiment, the type of filament used is glass or graphite or combinations thereof and the resin used is epoxy.

The principle steps for fabricating a wheel, such as a sprocket carrier, are shown in FIGS. 1 through 11. First, a continuous filament 10 is polar wound on a split mandrel 12 to form a filament-wound preform 14 (FIG. 2) having a generally spheroidal shape. Second, the spheroidal preform 14 is split at 16 perpendicular to the center line 17 of the mandrel 12 to obtain a pair of hemispheroidal preforms 18, FIGS. 2 and 3. Third, the split preforms 18 upon the split mandrel 12 are placed back-to-back, FIG. 7, and pressed under heat to cure and join the structure, FIG. 9. Finally, the split mandrels 12 are separated from the filament-wound preforms 18, FIG. 10.

FIG. 1 schematically illustrates a preform winding apparatus 20 for practicing the method of the present invention for winding a wheel. The continuous filament 10 is removed from a roving package 22 and passed about a tensioning system 24 before being coated in the resin impregnating bath system 26. The filament 10 penetrates a feed eye 28 for guiding the filament onto the split mandrel 12. In the polar winding operation, the feed eye 28 is normally maintained in a stationary position. However, the feed eye may be adjusted along support arm 30, if necessary. The split mandrel 12 is positioned on a supporting axis 32 which is integrally connected to one end of a Z-shaped arm 34 whose second end connects to a main frame 36 for rotation about that point of connection, as shown by arrow 38. Rotation of the Z-shaped arm 34 causes the filament 10 to wind about split mandrel 12 at a winding angle with respect to the center line 17 of the mandrel. The mandrel 12 is then rotated about axis 32 as shown by arrow 40 to cause each additional filament wrap to be placed in side-by-side relationship with the preceding filament winding.

In FIG. 1, the polar winding step comprises a plurality of winding layer. A first sequence of continuous filament 10 wound about the split mandrel 12 occurs at a first winding angle $\theta$ which is defined as the angle between the center line 17 of mandrel 12 and the line formed by the filament 10 as it exits the feed eye 28. It will be understood that, as the Z-shaped arm 34 rotates about its point of connection to mainframe 36° for 360°, a continuous winding of filament 10 will be placed upon the split mandrel 12. If the split mandrel 12 is then rotated through a small angle in a clockwise direction as indicated by arrow 40, the next winding of filament 10 will be placed just below the first winding shown in FIG. 1. As the arm 34 rotates 360°, the opposite side of the split mandrel 12 will see the second winding placed just above the first winding. Thus, the reader will understand that a full layer of filament 10 may be placed upon 360° of the surface of the mandrel 12 by rotating that mandrel only 180° about its axis 17. The reader will also understand that the filament material will build up faster at the ends of the mandrel 12 than at the split line 16 or center of the mandrel. See FIG. 4, for example. In the preferred embodiment, the buildup may be reduced by varying the acute angle $\theta$ between the filament line and the center line 17 of the mandrel. This variation may be accomplished, for example, by adjusting a knob 42 which permits a mounting plate 44 to rotate upon arm 34.

By varying the winding angle $\theta$ from 4° to 15°, for example, the polar opening about shaft 32 may be varied. For example, in the preferred embodiment, the first layer of filament winding on the mandrel 12 is built up with a winding angle of 6° to provide polar openings of approximately six inches diameter. After the split mandrel 12 is rotated 180° to place a single layer of filament windings on the mandrel, the winding angle $\theta$ is changed to 8° to provide polar openings of approximately seven inches and to place a second layer of filament windings upon the mandrel 12 at a slightly different angle. For a third layer of filament windings, the winding angle is adjusted to 10° to provide an opening of approximately eight inches. The reader should note that the winding angle has been described here with respect to the polar opening in the spheroidally shaped preform 14. However, a more important design parameter for establishing the winding angle is an angle which efficiently resists loads applied to the finished wheel structure. It will be understood that two layers of filament windings may be deposited by rotating the mandrel 12 only 360° about its center line 17, while the arm 34 turns the mandrel 12 through a series of revolutions to accomplish the winding. To place three layers of filament windings 10 upon the mandrel 12, the mandrel is rotated 540°.

Figure 2:
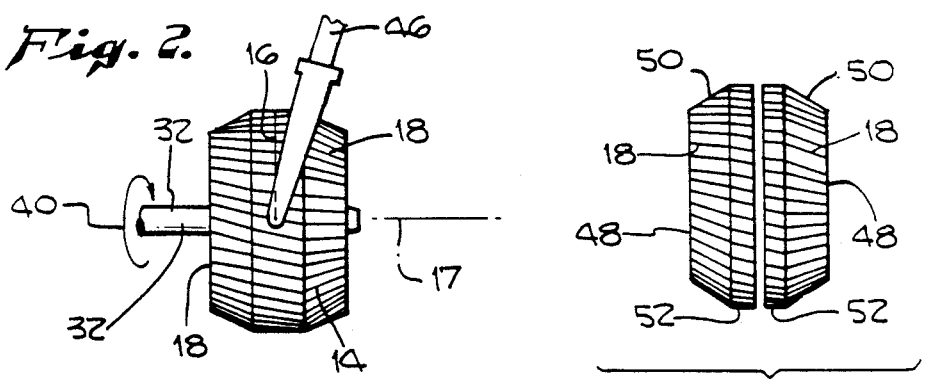
FIG. 2 schematically shows the spheroidal preform splitting operation.

After the polar winding operation described above has been completed, the resulting spheroidally shaped filament-wound preform 14 is split along the line 16 by a splitting tool 46 as seen in FIG. 2. The splitting tool 46 may be mounted upon the feed eye mechanism 28, FIG. 1.

The splitting operation results in two hemispheroidal preform 18, as shown in FIG. 3. The continuous nature of the filament 10 is clearly disclosed by the orientation of the filament winding across the two preforms 18. Each preform 18 includes a first hub section 48 and a connecting web section 50 arranged at an acute angle to the hub section for connecting a rim section 52 shown at a right angle to the hub 48 in FIG. 3.

Figure 4:
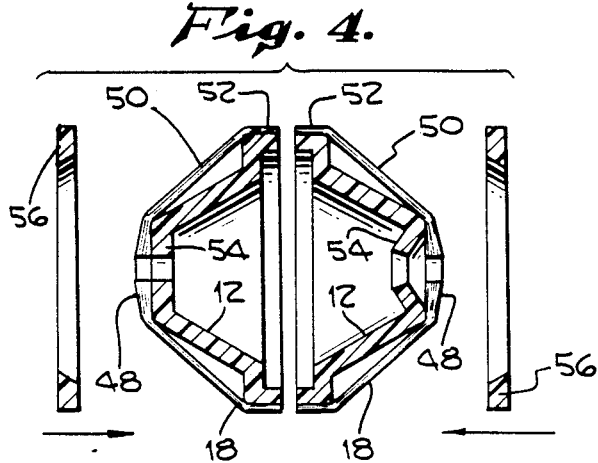
FIG. 4 is similar to FIG. 3 showing the pair of split, filament-wound preforms in cross section mounted upon the split mandrels.

FIG. 4 is similar to FIG. 3 but shows the split hemispheroidal preforms 18 and the split mandrel 12 in cross section. It will now be seen that the connecting web 50 does not contact the split mandrel 12 as the filament 10 is wound thereabout. The filament buildup in hub section 48 is also illustrated in FIG. 4. Note that one option within the present invention is to provide one of the split mandrels 12 with a surface 54 which supports the hub section 48 of the preforms 18. In FIG. 4, the right-hand split mandrel is 12 shown with the surface 54 indented. The reason for this indentation will be seen by reference to FIG. 12 wherein the preforms 18 have been assembled in a back-to-back configuration with one hub section 48 formed with its outer surface generally perpendicular to the center line of the wheel or sprocket carrier; while the other hub section 48 has its outer surface at an obtuse angle to the axis. This is the reason for the offset mandrel surface 54 shown on the right-hand mandrel in FIG. 4.

FIG. 4 also shows two toroidally shaped inserts 56 which may be formed from the continuous wrapping of the same resin coated filament as used to form the hemispheroidal preforms 18. In the preferred embodiment, however, the toroidal insert 56 is formed by a woven strip of fibers, which are woven at 90° to each other and at 45° to a radial from the center line of the wheel. This woven strip is then shaped into the toroidal form shown in FIG. 4 and pressed against preforms 18.

Figure 5:
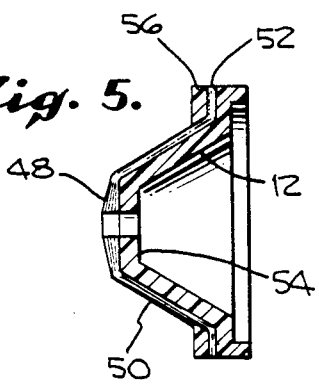
FIG. 5 shows a single filament-wound preform upon a mandrel after a toroidally shaped insert has been pressed upon the preform.

As seen in FIG. 5, the pressing of toroidal strip 56 onto the connecting web section 50 of preform 18 caused the web section to conform to the configuration of the split mandrel 12 and pulls the rim section 52 away from its split mandrel support to orient the rim section 52 at right angles to the axis of the wheel being formed and generally parallel to the hub section 48 thereof.

Figure 7:
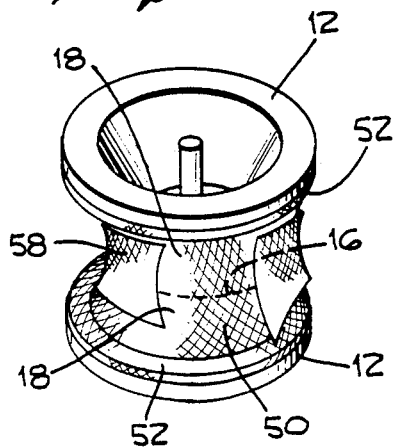
FIG. 7 shows the split mandrel arranged back-to-back to join the split filament-wound preforms thereon with the cylindrically wound preform wrapped about the assembled preforms.

After the second step of splitting the hemispheroidally shaped filament-wound preforms 18 has been completed, and the toroidally shaped rim 56 added to each hemispheroidal preform 18, the preforms 18 are assembled in a back-to-back configuration as shown in FIG. 7.

Figure 6:
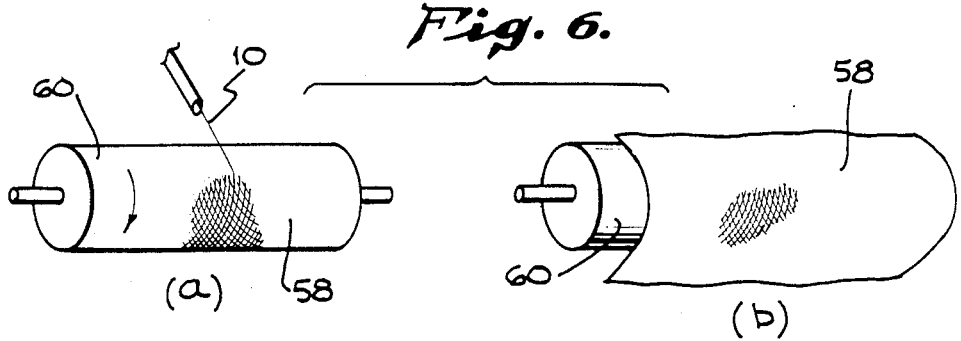
Figure 8:
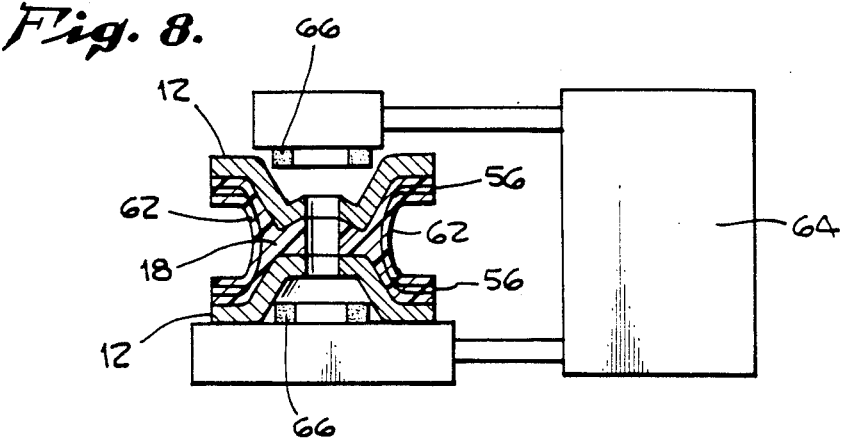
FIG. 8 illustrates a preheating step of the assembled filament-wound preforms.

As shown in FIG. 6, a cylindrically wound preform 58 may be wound upon a cylindrical mandrel 60 from the same resin coated filament 10 that was used to wind the spheroidally shaped preform 14. The winding angle of the filament 10 which forms cylindrically wound preform 58 is plus or minus 10° to the axis of mandrel 60 and two to four layers of filament windings are placed upon the mandrel. Thereafter, the cylindrical preform 58 is slit as shown in FIG. 6b and wrapped about the joined hemisphersidal preforms 18 as shown in FIG. 7. Thus, the cylindrically wound preform 58 forms a saddle insert 62, as best seen in FIG. 8.

Before the hemispheroidal preforms 18 are placed in a back-to-back configuration as shown in FIG. 7, the preforms may be chilled, preferably when still in the spheroidal shape 14 shown in FIG. 2. This facilitates handling and shaping.

After the assembly of the two hemispheroidal preforms 18 as shown at FIG. 7, the assembly, including the split mandrels 12, may be inductively heated in an optional preheat step. The induction heater 64 includes 2 induction coils 66 as shown in FIG. 8. The inductions coils 66 optionally raise the temperature of the preform assembly to approximately 150° F. The temperature is selected to be low enough for safe handling yet high enough to minimize the time necessary for the pressure and temperature curing step shown in FIG. 9.

Figure 9:
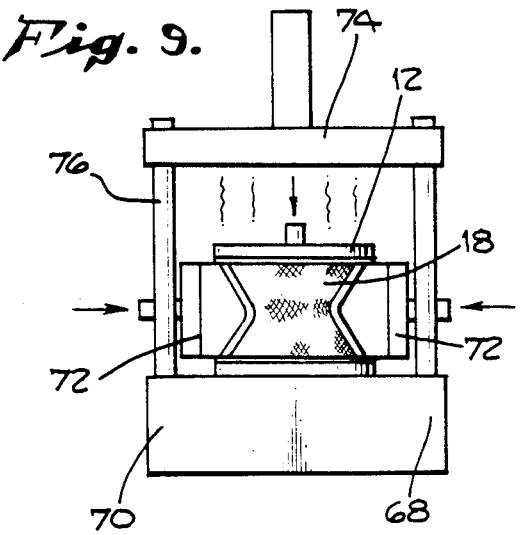
FIG. 9 depicts a pressure and temperature molding step.

The assembled hemispheroidal preforms 18 are then placed within a compression mold 68 along with the split mandrels 12. The mold 68 consists of a base 70 which supports four side rams 72, only two of which are shown in FIG. 9. Each ram has a surface that covers a 90° arc and conforms to the desired final shape of the assembled hemispheroidal preforms 18. Additionally, a press 74 is provided which rides on guides 76 to apply pressure, in combination with the rams 72, to all surfaces of the hemispheroidally shaped preforms 18. Located within the surface of the press 74 and the four side rams 72 are resistance heaters, not shown, which are utilized to elevate the temperature of the preforms 18 as pressure is applied thereto.

The compression pressures applied by press 74 and rams 72 may range from 150 to 1000 psi, but in the preferred embodiment a minimum pressure of 250 psi is used. The mold temperature may vary between 275° to 350° F. depending on the curing requirement of the resin system being used. However, the preferred embodiment utilizes a temperature of 275° F. The time necessary to cure the preforms 18 during the pressing operation is in the range of 5 to 15 minutes. In the preferred embodiment, a ten-minute pressing time has been used.

After the temperature and pressure curing step of FIG. 9, the molded preform 18 is removed from the two split mandrels 12 by the use of air injectors, for example.

The final temperature treatment of the molded preform 18 is a post curing operation at an elevated temperature for a fixed period of time. This elevated temperature treatment step may be accomplished by placing the molded preform 18 in an oven 78, FIG. 10, for a fixed period of time or by conveying the preform through a continuous oven, not shown. The elevated temperature treatment step occurs at 325° F. for a period of two hours in the preferred embodiment.

Figure 12:
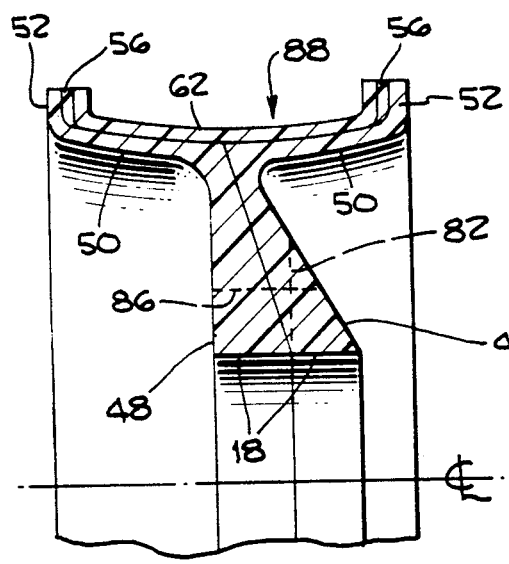
FIG. 12 is a cross-sectional view of the two filament-wound preforms in their assembled Y-shaped configuration.

The molded preform, after removal from the post cure oven 78, has a Y-shaped cross-sectional configuration, as shown in FIG. 12. The outer surface of the left-hand preform 18 is generally perpendicular to the axis of the wheel while the outer surface of the right-hand preform 18 is at an obtuse angle to that axis. The obtuse angle of the outer surface of the right-hand preform 18 is formed due to excessive filament buildup during the polar winding of the spheroidally shaped filament-wound preform 14. This excess buildup has been limited to some extent by the use of the three winding angles $\theta$ described above. However, the buildup may be removed by a pair of machining steps illustrated by the dashed lines 82 and 86 in FIG. 12.

To accomplish the machining steps, the molded preform 18 is placed within a milling machine 80, for example, and a first cut is made along line 82 by an end milling tool 84. Thereafter, a bore shown by line 86 in FIG. 12 is made to increase the inner diameter. The arrangement of FIG. 12 permits all machining steps to be accomplished from a single side of the wheel 88 thus formed. Obviously, other machining sequences are possible within the teachings of the present invention.

Figure 10:
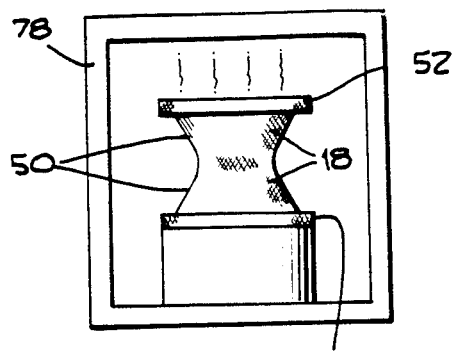
FIG. 10 demonstrates an optional post curing step.
Figure 11:
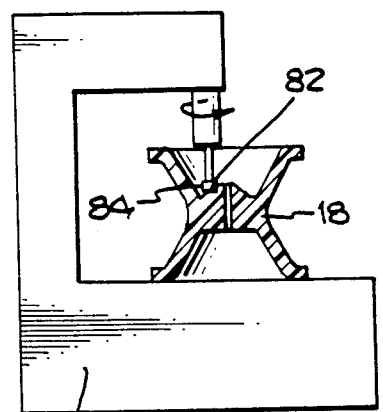
FIG. 11 shows a machining step.

FIG. 12 generally illustrates the Y-shaped cross-section of the wheel 88 formed by the process described thus far. The reader will understand that wheel 88, as described, is formed completely from filamentary reinforced plastic (FRP). The reader should also understanding that the chilling step described above, the preheat step shown in FIG. 8, and the post cure step shown in FIG. 10 are optional steps. Further, the use of the toroidally shaped rim portions 56 and the saddle insert 62 are options which may be used to increase the strength of the above-described wheel 88 at the appropriate places. The key to the invention described thus far is the polar winding of a continuous filament at an appropriate angle to provide a strong, light weight, corrosion resistant wheel, specifically designed for an appropriate task, in this case a sprocket carrier.

Figure 13:
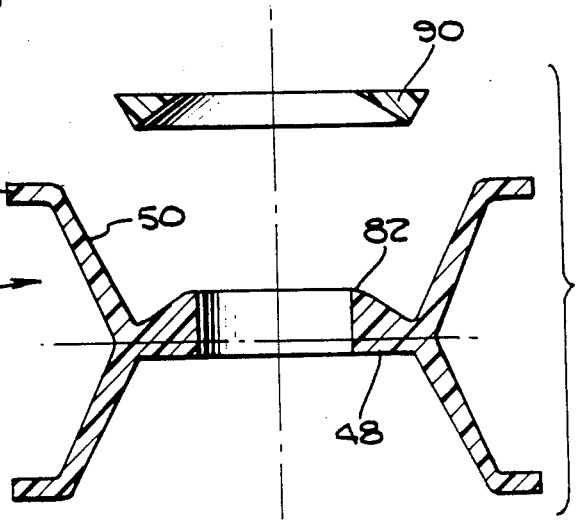
FIG. 13 demonstrates an optional step wherein a triangular hub ring may be added to the configuration of FIG. 12.

Referring now to FIG. 13, a triangularly shaped hub ring casting 90 is shown. The triangular shape describes the cross-section of the toroid that is placed upon the outer surface of the right-hand preform 18 as shown in FIG. 12 to fill the gap left by the machining process which made the cut shown at line 82. The ring 90 may be made by casting resin impregnated filaments or by winding the same filament 10 about a suitable mandrel wherein the windings cross each other at 90° and are arranged at 45° to a radius projecting from the center of the toroidally shaped hub 90. The reader will understand that any appropriate method of forming the hub ring 90 may be utilized and that the hub ring may or may not be necessary.

Figure 14:
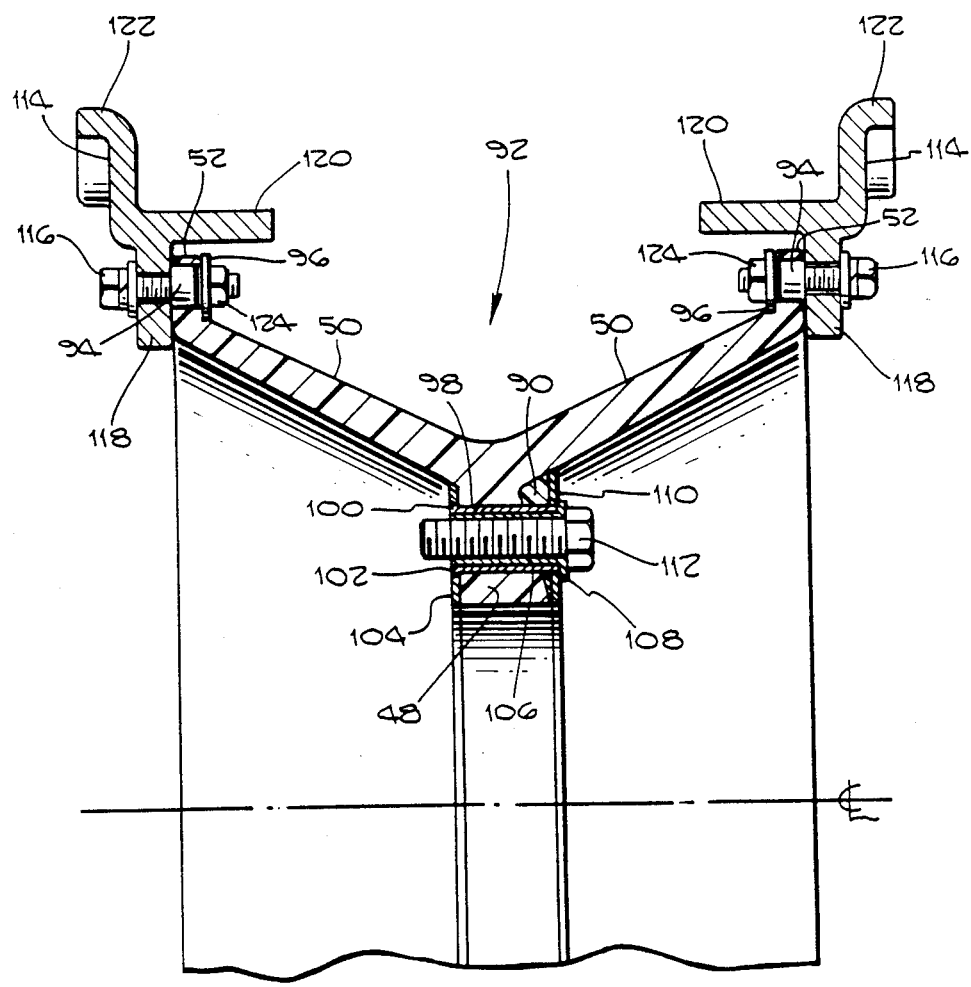
FIG. 14 is a cross-sectional view taken along line XIV—XIV of FIG. 15.

The assembled sprocket carrier wheel 92 is shown in greater detail in FIG. 14 after an additional set of machining steps have been performed on the hub 48 and the rim sections 52. The generally Y-shaped cross-section and only half of the sprocket carrier 92 is shown in FIG. 14. It will be noted that the rims 52 have been counterbored at a plurality of locations respectively to accommodate a plurality of bushings 94 which, in the preferred embodiment, are formed with a shoulder 96.

Each rim 52 is provided with eleven counterbored apertures respectively to receive eleven bushings 94. The bushings may be made of corrosion-resistant steel and are retained in the bores in rims 52 by a press fit and a suitable bonding material, such as epoxy.

Similarly, hub 48 has been machined to provide apertures which respectively outboard bushings 98 each having a flange 100 thereon. A careful inspection of FIG. 14 will show that the flange 100 fits within a chamfered opening 102 in an outboard shear plate 104. The bushing 98 is retained within the bore in hub 48 by a press fit and bonding with epoxy, for example. The interaction of flange 100 with the chamfer 102 retains the outboard shear plate 104 in the position shown. Similarly, a second inboard bushing 106 is press-fit into the outboard bushing 98 and retained therein by, for example, epoxy. A flange 108 on bushing 106 retains an inboard shear plate 110 in the position shown. The reader will note that the outer diameters of the outboard shear plate 104 and inboard shear plate 110 are not the same. These diameters are established to press firmly against the inner surfaces of connecting web sections 50. The purpose of the inboard and outboard bushings 98 and 106 and inboard and outboard shear plates 104 and 110 is to provide a support for bolts 112 which mount the sprocket carrier 92 to an appropriate hub, not shown. The bushings 98 and 106 and the sheer plates 104 and 110 may all be constructed from corrosion-resistant steel.

Referring to FIG. 14, a pair of sprockets 114 is shown bolted by bolts 116 respectively to the outer surfaces of rims 52 through bushings 94. Each sprocket 114 is formed with a bolt ring 118 having a track carrying platform 120 extending toward the center of sprocket carrier 92 (FIG. 14) and a plurality of teeth 122 extending radially therefrom. In FIG. 14, the bolts 116 are shown secured to rims 52 by nuts 124.

Figure 15:
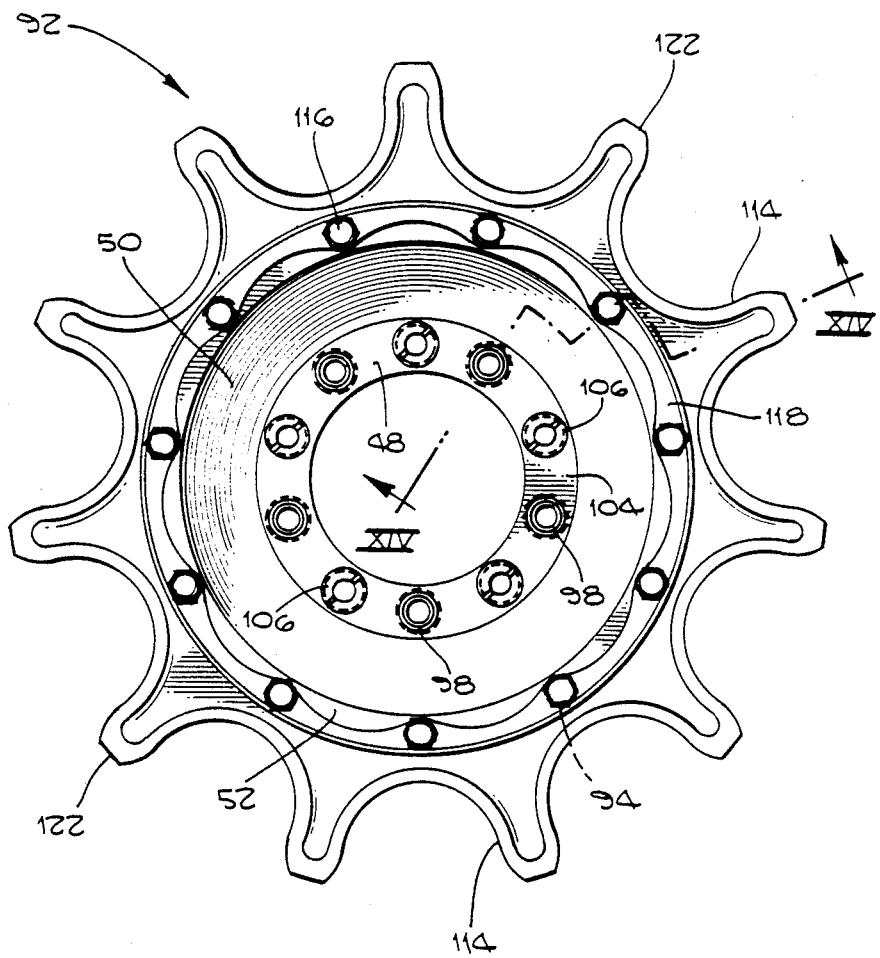
FIG. 15 is a side view of the assembled wheel of the present invention showing a sprocket mounted thereon.

As seen in FIG. 15, the outboard bushings 106 are alternately reversed to more efficiently secure the outboard and inboard shear plates 104 and 110. The reader will understand that other variations of the sprocket carrier 92, including the configuration of the shear plates, the number of bolt holes and bushing holes, the cross-section of the wheel 88, and the configuration of the sprocket 114 may all be varied within the teachings of the present invention. Accordingly, the present invention should be limited only by the appended claims.

I claim:

1. For rotation about an axis, a wheel structure formed by winding a continuous resin-impregnated filament about a generally spheroidal split mandrel to provide a generally spheroidal filament-wound preform, severing the spheroidal preform to provide two generally hemispheroidal preforms each having a hub portion, a rim portion, and a connecting portion joining the hub and rim portions, transposing the hemispheroidal preforms to position the hub portions adjacent each other and space the rim portions apart, and joining the two hub portions under heat and pressure to provide a wheel structure with a single hub portion.

2. A wheel structure as claimed in claim 1 wherein two toroidally shaped inserts of resin-impregnated filaments are pressed into position from opposite ends of the split mandrel after the severing of the generally spheroidal preform to reorient the rim portions generally into parallelism with the hub portions and to reinforce the reoriented rim portions.

3. A wheel structure as claimed in claim 2, additionally comprising a plurality of bushing means passing through each of said rim portions and its respective toroidally shaped insert.

4. A wheel structure as claimed in claim 3, additionally comprising a pair of sprockets positioned respectively on said rim portions, and a plurality of fastening means extending respectively through said bushing means to secure said sprockets in position.

5. A wheel structure as claimed in claim 2, additionally comprising a generally flat sheet of resin-impregnated filaments wrapped about the outer diameter of said wheel structure over said two connecting portions and about the full circumference thereof to reinforce said connecting portions.

6. A wheel structure as claimed in claim 5, wherein said toroidally shaped inserts are disposed on facing sides of said rim portions after the transposition of the hemispheroidal preforms and said flat sheet of resin-impregnated filaments is also wrapped over facing sides of said inserts.

7. A wheel structure as claimed in claim 1, wherein said single hub portion has an inboard surface and an outboard surface and additionally comprising a pair of shear plates mounted respectively against said inboard and outboard surfaces and a plurality of bushing means passing through said single hub portion and said shear plates to retain said shear plates against said single hub portion.

8. A wheel structure as claimed in claim 1, wherein said single hub portion has a first surface generally planar and generally perpendicular to said axis and a second surface generally frustoconical and generally at an obtuse angle to said axis when measured from the outer side of said second surface.

9. A wheel structure as claimed in claim 8, additionally comprising a hub ring molded of resin-impregnated filaments and having a triangular cross section, said hub ring being mounted against said second surface and providing an exposed planar surface generally perpendicular to said axis, and a shear plate mounted against said exposed planar surface of said hub ring.

10. For rotation about an axis, a sprocket wheel comprising a wheel structure formed by winding a continuous resin-impregnated filament about a generally spheroidal split mandrel to provide a generally spheroidal filament wound preform, severing the spheroidal preform to provide two generally hemispheroidal preforms each having a hub portion, a rim portion, and a connecting portion joining the hub and rim portions, pressing two toroidally shaped inserts of resin-impregnated filaments into position respectively from opposite ends of the split mandrel to reorient the rim portions generally into parallelism with the hub portions and to reinforce the reoriented rim portions, transposing the hemispheroidal preforms to position the hub portions adjacent each other and space the rim portions apart, and joining the two hub portions under heat and pressure to provide a wheel structure with a single hub portion, a plurality of bushing means passing through each of said rim portions and its respective toroidally shaped insert, and a pair of sprockets mounted respectively on said rim portions by a a plurality of fastening means extending respectively through said bushing means.

* * * * *